US011063277B2

(12) United States Patent
Lee (10) Patent No.: US 11,063,277 B2
(45) Date of Patent: Jul. 13, 2021

(54) METHOD OF CONTROLLING AN IGNITION OF A FUEL CELL VEHICLE

(71) Applicants: HYUNDAI MOTOR COMPANY, Seoul (KR); KIA MOTORS CORPORATION, Seoul (KR)

(72) Inventor: Kevin Lee, Los Angeles, CA (US)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 1062 days.

(21) Appl. No.: 15/603,792

(22) Filed: May 24, 2017

(65) Prior Publication Data

US 2018/0342746 A1  Nov. 29, 2018

(51) Int. Cl.
| | | |
|---|---|---|
| *H01M 8/04302* | (2016.01) | |
| *H01M 8/0432* | (2016.01) | |
| *H01M 16/00* | (2006.01) | |
| *H02J 7/00* | (2006.01) | |
| *B60L 58/32* | (2019.01) | |
| *B60L 58/12* | (2019.01) | |
| *H02J 1/00* | (2006.01) | |
| *H02J 7/34* | (2006.01) | |
| *B60L 58/33* | (2019.01) | |
| *B60L 58/40* | (2019.01) | |
| *B60L 58/31* | (2019.01) | |
| *H01M 8/04492* | (2016.01) | |
| *H01M 8/1018* | (2016.01) | |
| *H01M 8/04955* | (2016.01) | |

(52) U.S. Cl.
CPC ........ *H01M 8/04302* (2016.02); *B60L 58/12* (2019.02); *B60L 58/31* (2019.02); *B60L 58/32* (2019.02); *B60L 58/33* (2019.02); *B60L 58/40* (2019.02); *H01M 8/04358* (2013.01); *H01M 8/04492* (2013.01); *H01M 16/006* (2013.01); *H02J 1/00* (2013.01); *H02J 7/0068* (2013.01); *H02J 7/34* (2013.01); *H01M 8/04955* (2013.01); *H01M 2008/1095* (2013.01); *H01M 2250/20* (2013.01); *H02J 2300/30* (2020.01)

(58) Field of Classification Search
CPC ........ B60L 58/30–40; H01M 8/04298–04955; H01M 8/04302
See application file for complete search history.

(56) References Cited

U.S. PATENT DOCUMENTS

| | | |
|---|---|---|
| 6,526,931 B1 | 3/2003 | Vilou |
| 6,671,612 B2 | 12/2003 | Fuse |

(Continued)

*Primary Examiner* — Eric R Smith
(74) *Attorney, Agent, or Firm* — Brinks Gilson & Lione (57) ABSTRACT

A method of controlling ignition of a vehicle having a fuel cell system is provided. In particular, the method includes a step of determining an idling state of the vehicle, a step of determining whether to enable a fuel cell on/off mode, a step of determining a degree of water balance of a fuel cell stack, and a step of turning off a vehicle's ignition switch. More specifically, a fuel cell system controller determines whether to enable a fuel-cell on/off mode based on a coolant temperature of the fuel cell system once the idling state is determined, and also determines a degree of water balance of a fuel cell stack of the fuel cell system. The fuel cell system controller turns off the vehicle's ignition switch, when a predetermined time passes, based on the degree of water balance.

9 Claims, 5 Drawing Sheets

(56) References Cited

U.S. PATENT DOCUMENTS

| | | | |
|---|---|---|---|
| 8,119,297 B2 | 2/2012 | Kwon et al. | |
| 8,877,403 B2 | 11/2014 | Takemoto et al. | |
| 2010/0291446 A1* | 11/2010 | Aso | H01M 8/04529 |
| | | | 429/429 |
| 2011/0087389 A1 | 4/2011 | Burleigh et al. | |
| 2015/0372329 A1* | 12/2015 | Jomori | B60L 3/0053 |
| | | | 429/432 |
| 2016/0141688 A1 | 5/2016 | Shiokawa et al. | |
| 2018/0358636 A1* | 12/2018 | Sato | H01M 8/04559 |

* cited by examiner

FIG. 5

METHOD OF CONTROLLING AN IGNITION OF A FUEL CELL VEHICLE

FIELD

The present disclosure relates to a method of controlling a fuel cell hybrid vehicle.

BACKGROUND

The statements in this section merely provide background information related to the present disclosure and may not constitute prior art.

A fuel cell converts chemical energy into electrical energy via a fuel cell stack. A vehicle can be powered by the electrical energy produced by the fuel cell stack. One form of the fuel cell for a vehicle is a polymer electrolyte membrane fuel cell ("PEMFC"), which includes a membrane electrode assembly ("MEA"), a gas diffuser layer ("GDL") to uniformly diffuse reactant gases and to transmit generated electricity, a gasket and a sealing member to maintain airtightness of the reactant gas and coolant under an appropriate bonding pressures, and a bipolar plate to transfer the reactant gases and coolant. In particular, the MEA has a polymer electrolyte membrane ("PEM") to transport hydrogen ions, and an electrode catalyst layer, in which an electrochemical reaction takes place, disposed on both sides of the PEM.

Hydrogen as a fuel and oxygen (air) as an oxidizing agent are respectively supplied to an anode and a cathode through the bipolar plate. The hydrogen supplied to the anode is dissociated into hydrogen ions (protons, H+) and electrons (e−) by catalyst of the electrode catalyst layer provided on both sides of the electrolyte membrane. At this time, only the hydrogen ions are selectively transmitted to the cathode through the electrolyte membrane, which may be in a form of a cation exchange membrane, and at the same time, the electrons are transmitted to the anode through the GDL and the bipolar plate, which function as a conductor. At the cathode, the hydrogen ions supplied through the electrolyte membrane and the electrons transmitted through the bipolar plate meet the oxygen in the air supplied to the cathode by an air supplier and cause a reaction that produces water. Due to the movement of hydrogen ions, the flow of electrons through an external conducting wire occurs, and thus a current is generated.

Since the generation of the electricity by the fuel cell involves electrochemical reaction, the fuel cell alone has technical issues to provide a vehicle with sufficient electric energy in time. For example, the vehicle may need a high voltage output from the fuel cell for a driving motor in a high speed driving mode. The fuel cell alone as the power source may be hard to meet the desired level of voltage output and thus an acceleration performance of the vehicle is undermined. Similarly, a sudden change in load may cause significant delay in acceleration and a driver to push more an accelerator pedal. Such an operating condition drops the energy efficiency as well.

A fuel cell hybrid vehicle has been developed to resolve the above-described technical issues. The fuel cell hybrid vehicle is equipped with storage means such as a high voltage battery or a supercapacitor as an auxiliary power source to suitably provide the power desired for driving the motor in addition to the fuel cell as a main power source. While the fuel cell continuously generates electronic power at a constant level during vehicle's driving, any surplus power generated by the fuel cell charges the storage means so that if the electric power is insufficient to meet desired power for the vehicle in a certain driving condition, the vehicle is supplied additional power from the storage means. With this arrangement, the vehicle may increase durability of the fuel cell, and fuel efficiency through a high generative braking as well as the acceleration performance of the fuel cell hybrid vehicle.

In general, when the vehicle is not moving or the vehicle is parked with an ignition switch in an on state (i.e., idling state), the fuel cell may turn off and the vehicle operates only on a battery until the state of charge ("SOC") of the battery is lower than a predetermined value. If the SOC is determined to be lower than the predetermined value, the fuel cell turns on and charges the battery. This cycle is referred to as a fuel cell on/off mode.

The fuel cell (i.e., fuel cell stack) needs to be as humid as possible because the protons can move well to the cathode from the anode through the electrolyte membrane when the fuel cell stack is in a humid state. When the fuel cell stack is dry, the electrolyte membrane is dry and protons cannot move well so that the performance of the fuel cell stack drops. In particular, when the electrolyte membrane is repeatedly dried and humidified, durability of the electrolyte membrane decreases. We have also discovered that the operation of the fuel cell on/off mode at the idling state may cause flooding or dry-out of the stack of the fuel cell and that the durability of the electrolyte membrane of the fuel cell stack drops. The present disclosure addresses this problem.

SUMMARY

The present disclosure provides a compact heat pump system for a vehicle to improve energy efficiency.

In one form, the present disclosure provides a method of controlling ignition of a vehicle having a fuel cell system. The method includes: determining, by a controller, that a vehicle is in an idle state based on whether an ignition switch of a vehicle is on and whether the vehicle is parked; after determining that the vehicle is in the idle state, determining, by the fuel cell system controller, whether to enable a fuel-cell on/off mode based on a coolant temperature of the fuel cell system; after enabling or disabling the fuel-cell on/off mode, determining, by the fuel cell system controller, a degree of water balance of a fuel cell stack of the fuel cell system; turning off, by the fuel cell system controller, the ignition switch of the vehicle, based on the degree of water balance, after a first predetermined time period passes when the fuel cell stack is in the fuel-cell on/off mode; and turning off the ignition switch of the vehicle, based on the degree of water balance, after a second predetermined time period passes when the fuel-cell on/off mode is disabled.

In particular, the method further includes: disabling, with the fuel cell system controller, the fuel-cell on/off mode when the coolant temperature is lower than a predetermined temperature; and enabling, with the fuel cell system controller, the fuel-cell on/off mode when the coolant temperature is greater than the predetermined temperature.

In another form, the control method includes: when the fuel-cell on/off mode is disabled, determining, with the fuel cell system controller, whether the degree of water balance is in a dry state; and when the fuel-cell on/off mode is enabled, determining, with the fuel cell system controller, whether the degree of water balance is in a wet state.

In one aspect of the present disclosure, the method includes, when the degree of water balance is determined to be in the dry state, initiating, with the fuel cell system controller, a counter and turning off the ignition switch of the vehicle when the counter reaches the second predetermined time period.

Whereas, when the degree of the water balance is determined to be in the wet state, initiating, with the fuel cell system controller, a counter and turning off the ignition switch of the vehicle when the counter reaches the first predetermined time period.

In still another form, the method may include: when the fuel cell system controller determines to disable the fuel-cell on/off mode, turning on the fuel cell system and continuing to operate the fuel cell system regardless of a status of charging (SOC) level of a battery of the fuel cell system.

Meanwhile, the method may include: when the fuel cell system controller determined to enable the fuel-cell on/off mode, turning on the fuel cell system when a status of charging (SOC) level of a battery of the fuel cell system is less than a predetermined level; and turning off the fuel cell system when the SOC level is equal or greater than the predetermined level.

The method of the present disclosure may include, when the fuel-cell on/off mode is enabled and the fuel cell system is on, charging the battery, and when the fuel cell system is in an off mode of the fuel-cell on/off mode, cutting off air supply by an air blower while a cooling pump and a fuel cell hydrogen circulation pump are active.

In one form, the degree of water balance is calculated as:

$$m\_h2o\_total = m\_v\_air\_in + m\_v\_h2\_in + m\_h2o\_prud - m\_v\_air\_out - m\_v\_h2\_out$$

where, m_h2o_total is a stack water balance, m_v_air_in is a cathode inlet saturated vapor mass flow rate [g/s], m_v_h2_in is an anode inlet saturated vapor mass flow rate [g/s], m_h2o_prud is water generation rate [g/s], m_v_air_out is a cathode outlet saturated vapor mass flow rate [g/s], and m_v_h2_out is an anode outlet saturated vapor mass flow rate [g/s].

In another form, the present disclosure provides a fuel cell system of a vehicle including a controller configured to determine that a vehicle is in an idle state based on an input from an ignition switch of a vehicle and a parking state of the vehicle. In particular, a fuel cell system controller of the fuel cell system is configured to enable or disable a fuel-cell on/off mode when the vehicle is in the idle state and based on a coolant temperature of the fuel cell system measured by a coolant temperature sensor.

More specifically, the fuel cell system controller is configured to determine a degree of a water balance of a fuel cell stack of the fuel cell system, and configured to send a signal to the controller to turn off the ignition switch of the vehicle, based on the determined degree of water balance, after a first predetermined time period passes when the fuel cell stack operates in the fuel-cell on/off mode, Whereas the fuel cell system controller is configured to send a signal to the controller to turn off the ignition switch of the vehicle, based on the determined degree of water balance, after a second predetermined time period passes when the fuel-cell on/off mode is disabled.

In one form, when the fuel-cell on/off mode is disabled, and the degree of water balance is in a dry state, the fuel cell system controller initiates a counter and increments by one second until the counter reaches the second predetermined time period. Alternatively, when the fuel-cell on/off mode is enabled, and the degree of water balance is in a wet state, the fuel cell system controller initiates a counter and increments by one second until the counter reaches the first predetermined time period.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure provides a control method of the ignition of a vehicle, and in particular, turning off the ignition switch of the vehicle after a predetermined time based on a state of the vehicle (e.g., idling state) and a degree of water balance of a fuel cell stack of the vehicle. The control method enhances the durability of the fuel cell stack by inhibiting or preventing the fuel cell stack from being dry or flooding in the idling state.

Figure 1:
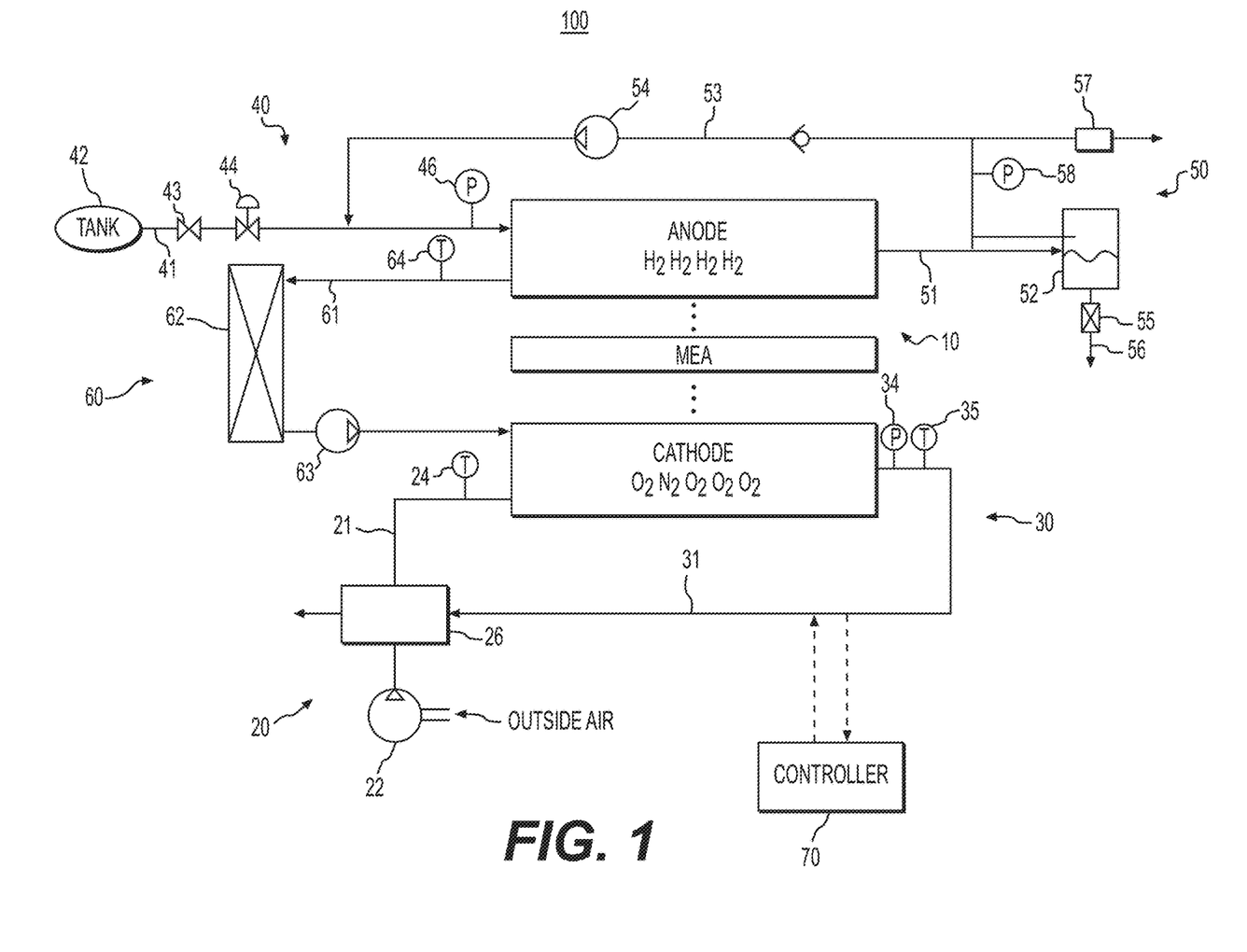
FIG. 1 is a schematic diagram of a fuel cell system for a vehicle in one form of the present disclosure.

FIG. 1 is a schematic diagram illustrating a configuration of a fuel cell system 100 applying a process of controlling the ignition of a vehicle 1. The fuel cell system 100 includes a fuel cell stack 10, a cathode gas supply portion 20, a cathode discharge portion 30, an anode gas supply portion 40, an anode gas circulation and discharge portion 50, a coolant supply portion 60, and a fuel cell system controller 70 of the fuel cell system.

The fuel cell stack 10 is a polymer electrolyte fuel cell which generates power through electrochemical reaction between hydrogen and oxygen. The hydrogen in a hydrogen tank 42 is supplied to the anode of the fuel cell stack 10 through the anode inlet pipe 41, and an air blower 22 supplies the air to the cathode of the fuel cell stack 10 through a cathode inlet pipe 21. The fuel cell stack 10 has a stacked structure in which a plurality of unit cells is stacked one on another. Each cell has a membrane electrolyte assembly that is a power generator in which electrodes are arranged on both surfaces of an electrolyte membrane, and two separators that sandwich the membrane electrolyte assembly.

The electrolyte membrane may be a solid polymer thin film having characteristics of excellent proton conductivity when the dryness degree is the wet state. It should be noted that in the present disclosure, the dryness degree is an index that is decided either as a wet state or a dry state. The wet state is a state in which the electrolyte membrane performs the excellent proton conductivity, and which does not hinder the operation of the fuel cell stack 10. Whereas, the dry state is a state which is not the wet state, and in which the proton conductivity is deteriorated so that the operation of the fuel cell stack is hindered.

The cathode gas supply portion 20 includes the cathode inlet pipe 21, the air blower 22, and a cathode inlet temperature sensor 24 disposed in the cathode inlet pipe near the cathode to measure a temperature of the supplied air. The cathode inlet temperature sensor 24 is disposed at a cathode gas inlet portion of the fuel cell stack so as to detect the temperature of the supplied air and send it to the fuel cell system controller 70. In meantime, the cathode gas discharge portion 30 includes a cathode discharge pipe 31, a cathode outlet pressure sensor 34, and a cathode outlet temperature sensor 35. The cathode discharge pipe 31 is a pipe which connects the cathode discharge side of the fuel cell stack to a humidifier 26 and by which the cathode gas is discharged to the outside of the fuel cell system 100 through the humidifier 26. The cathode outlet pressure sensor 34 and the temperature sensor 35 respectively measure the pressure and the temperature of the discharged cathode gas, and send the measured values to the fuel cell system controller 70.

In one form, the humidifier 26 is provided on the cathode inlet side of the fuel cell stack to humidify dry air supplied from the outside to the fuel cell stack. More specifically, dry air supplied by the air blower 22 is humidified by the humidifier 26 and supplied to the cathode of the fuel cell stack 10. Since the discharged cathode gas is humidified with water generated from the cathode, the discharged gas humidifies the dry air while it passes the humidifier 26. In another form, the cathode inlet and outlet temperature sensors 24, 35 are respectively disposed between in the cathode inlet pipe 21 and in the cathode discharge pipe 31 to measure temperature and pressure of the air and discharged cathode gas.

The anode gas supply portion 40 includes an anode inlet pipe 41, a hydrogen tank 42, a shut-off valve 43, and a regulator 44. The anode inlet pipe 41 connects the hydrogen tank 42 to the anode of the fuel cell stack 10 and the hydrogen is supplied to the anode of the fuel cell stack through the anode inlet pipe 41. At an anode inlet portion of the fuel cell stack, an anode inlet pressure sensor 46 is disposed so as to measure the pressure of the supplied hydrogen to the anode of the fuel cell stack 10. The shut-off valve 43 and the regulator 44, which are controlled by the fuel cell system controller 70, are provided in the anode inlet pipe 41 near the hydrogen tank 41. The shut-off valve 43 opens and closes to control the inflow of the hydrogen, and the regulator 44 adjusts the pressure of hydrogen.

In addition, the anode gas circulation and discharge portion 50 includes an anode discharge pipe 51, a water trap 52, an anode gas circulation pipe 53, a recirculation blower 54, a valve 55 to discharge water, a water discharge pipe 56, a hydrogen purge valve 57, and an anode outlet pressure sensor 58. An outlet port of the anode is connected to the water trap 52 by the anode discharge pipe 51 such that condensed water in the anode is stored in the water trap 52. The water in the water trap 52 is discharged through the valve 55 and the water discharge pipe 56.

Furthermore, the hydrogen purge valve 57 is used to discharge impurities and condensed water in the anode to improve the performance of the fuel cell stack. The water trap 52 separates the gas component and the water component included in the discharged anode gas which contains the un-reacted gas (e.g., hydrogen and nitrogen), channels the gas into the anode gas circulation pipe 53, and the water into the water discharge pipe 56. The anode gas circulation pipe 53 is connected to the anode inlet pipe 41, and the recirculation blower 54 is disposed in the anode gas circulation pipe 53 and feeds gas separated by the water trap 52 to the anode inlet pipe 41. The pressure of the discharged anode gas is measured by the anode outlet pressure sensor 58 and is sent to the fuel cell system controller 70.

As illustrated in FIG. 1, the fuel cell system 100 may incorporate the coolant supply portion 60 that includes a coolant pipe 61, a radiator 62, a coolant pump 63 to circulate coolant, and a coolant temperature sensor 64. The coolant to cool the fuel cell stack circulates in the coolant pipe 61 and is cooled by the radiator 63 via heat exchange between the coolant and the outside air. The coolant temperature sensor 64 is provided near a coolant outlet port of the fuel cell stack and sends the measured temperature to the fuel cell system controller 70. Thus, the fuel cell system controller 70 detects the operating temperature of the fuel cell stack 10 from the measured value of the coolant.

Figure 2:
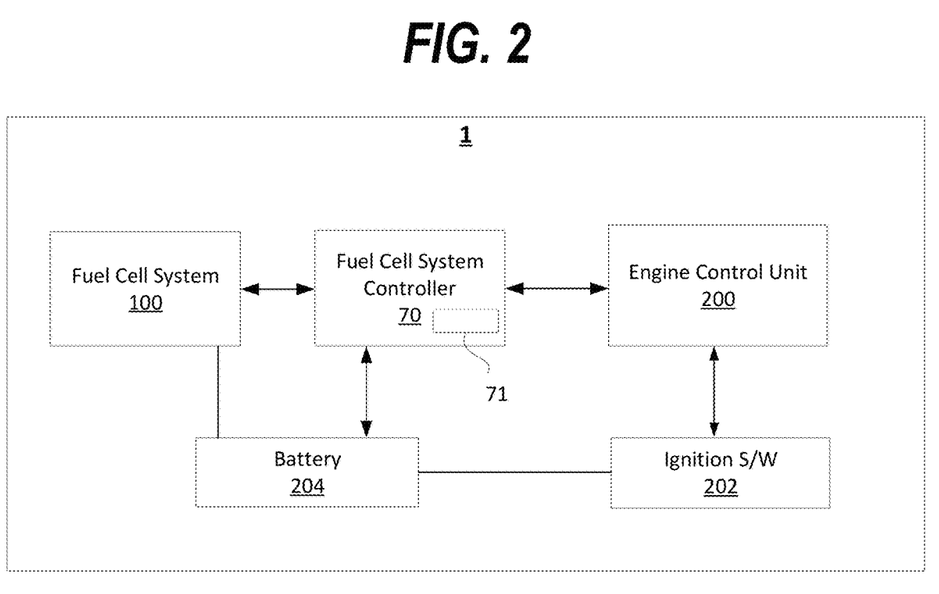
FIG. 2 is a schematic diagram illustrating a vehicle including a fuel cell system.

Furthermore, as illustrated in FIG. 2, the fuel cell system controller 70 may exchange data with an Engine Control Unit ("ECU") 200, and the data may include, but are not limited to, the cathode inlet and outlet temperatures, the anode inlet and outlet pressures, and the coolant temperature, as well as the state of the vehicle including the state of an ignition switch 202 (e.g., ignition switch on or off state), and a position of a shift lever of a transmission etc. In particular, the ECU 200 may receive signals from the ignition switch 202 and exchanges the signals with the fuel cell system controller 70 to operate the fuel cell system 100 so as to generate electric energy to move the vehicle 1.

In one form, a vehicle operated by the electric energy generated by the fuel cell system may be equipped with storage means, for example, a high voltage battery or supercapacitor as an auxiliary power source to suitably provide a driving motor with the electric energy at a constant level even when the electric power is insufficient to meet desired power the vehicle in a certain driving condition. The vehicle 1 further includes a battery 204 as an auxiliary power source in addition to the fuel cell system 100 which is a main power source. The battery 204 in FIG. 2 may supply initial electric energy to the fuel cell system 100 or to the vehicle to operate the vehicle 1.

In general, when the vehicle is not moving or is parked with an ignition switch in an on state (i.e., idling state), the fuel cell system controller may turn off and the vehicle operates only on a battery until the state of charge ("SOC") of the battery is lower than a predetermined value. If the SOC is determined to be lower than the predetermined value, the fuel cell turns on and charges the battery, namely, a fuel cell on/off mode. However, the continuous operation of the fuel cell stack in the idling state consumes a significant amount of fuel (i.e., hydrogen) and may also shorten the life time of the fuel cell stack.

The present disclosure provides a control method for controlling an operation of a fuel cell system based on an operating state of a vehicle (e.g., the idling state) and a degree of the water balance of the fuel cell stack, which will be described below in detail.

Figure 3:
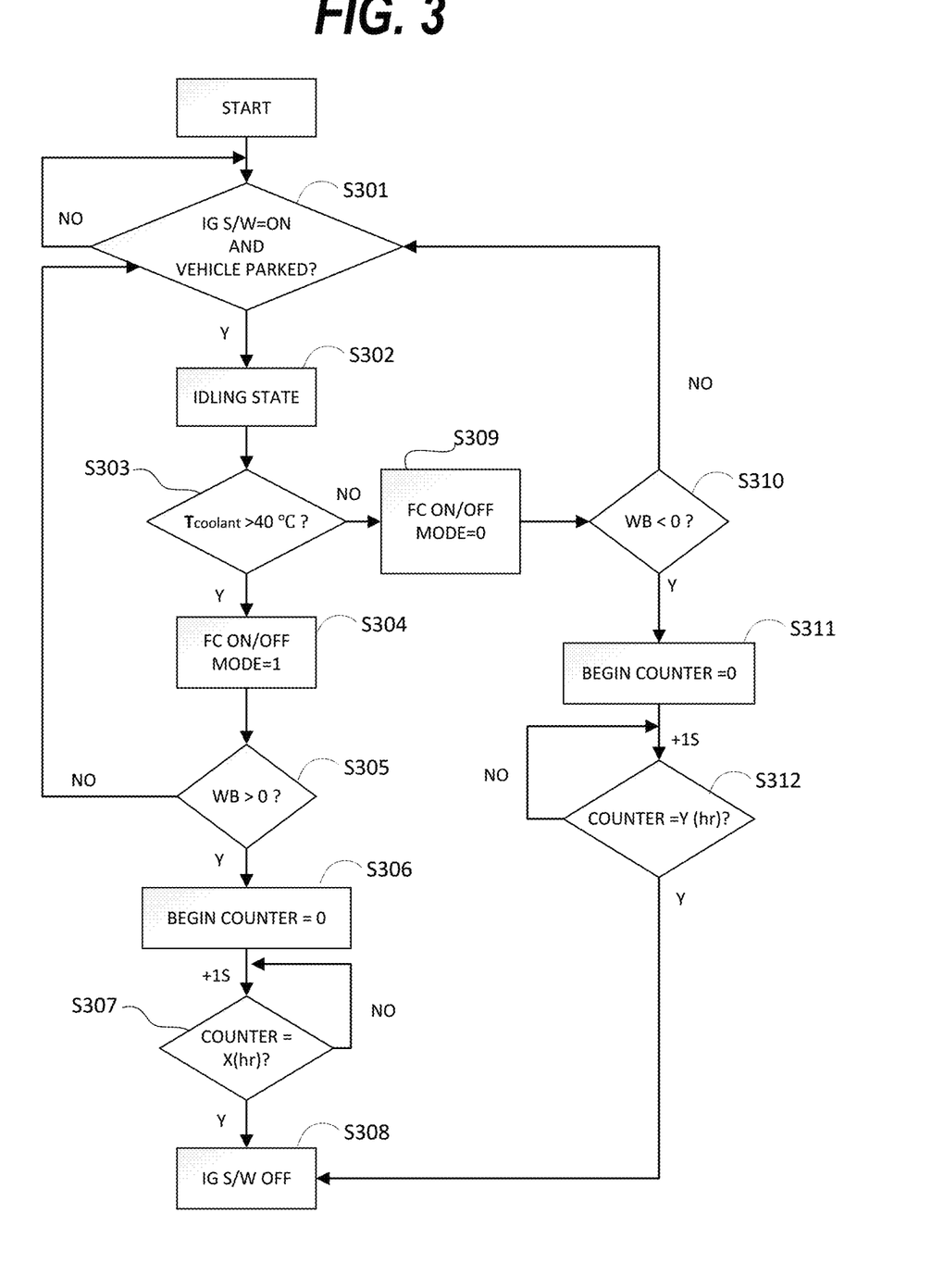
FIG. 3 is a flowchart illustrating a process of controlling the ignition of a vehicle in one form of the present disclosure.

Referring to FIG. 3, the method includes a step of determining whether a vehicle 1 is in an idling state, a step of determining whether to enable a fuel cell on/off mode, a step of determining a degree of water balance of a fuel cell stack, and a step of turning off a vehicle's ignition switch. More specifically, a controller 200 (e.g., an engine control unit or a body control unit) determines whether a vehicle's ignition switch 202 is on and whether the vehicle is parked at step S301. When the controller 200 determines that the ignition switch 202 is on and that the vehicle is parked, the controller determines that the vehicle is in an idle state at step S302.

However, if at step S301, the controller determines that vehicle's ignition switch 202 is not on or that the vehicle is not parked, the process returns to the beginning and is ready to perform step S301 upon receipt of a new input from the controller 200

Since the controller 200 receives various information of the vehicle, including a position input of a shift lever of the vehicle and the state of the ignition switch 202, whether or not the vehicle is in the idling state can be determined. That is, when the ignition switch is on and the shift lever is in a parking position, the controller 200 determines it as the idling state where the vehicle is not moving with the ignition switch on mode.

Once the vehicle is determined to be in an idling state, the fuel cell system controller 70 receives a coolant temperature of the fuel cell system from the coolant temperature sensor 64 and determines whether to enable the fuel-cell on/off mode based on the received coolant temperature of the fuel cell system (S303). In the fuel-cell on/off mode, the fuel cell stack may turn off and the vehicle operates only on the battery 204 until the state of charge ("SOC") of the battery is lower than a predetermined value. If the SOC is determined to be lower than the predetermined value, the fuel cell stack turns on and charges the battery 204. This cycle is referred to as the fuel cell on/off mode.

More specifically, when the fuel cell system controller 70 determines that the coolant temperature is less than a predetermined temperature at S303, the fuel cell system controller 70 disables the fuel-cell on/off mode at S309. In general, when the fuel-cell on/off mode is disabled, the fuel cell system turns on and continues to operate regardless of the SOC level of the battery.

Alternatively, when the fuel cell system controller 70 determines that the coolant temperature is equal to or greater than the predetermined temperature at S303, the fuel cell system controller 70 activates the fuel-cell on/off mode at S304. In some forms, the value of the temperature is an experimental value and may be approximately 40° C. More specifically, if the fuel-cell on/off mode is enabled and the SOC of the battery 204 is equal to or greater than a predetermined value, the operation of the fuel cell stack 10 is turned off by stopping the operation of the air blower 22 (i.e., air blower RPM=0). Whereas when the fuel-cell on/off mode is enabled and the SOC of the battery 204 is less than the predetermined value, the operation of the fuel cell stack 10 turns on (i.e., air blower RPM>0) and the battery 204 is charged. It should be noted that the coolant pump 63 and the recirculation blower 54 should still be active even when the operation of the fuel cell stack is turned off. In other words, under the fuel-cell off mode of the fuel-cell on/off mode, only air supply is cut.

At step S305, which is performed when the fuel cell on/off mode is enabled, the fuel cell system controller 70 determines a degree of water balance of a fuel cell stack of the fuel cell system. As discussed above, the fuel cell stack needs to be as humid as possible because protons can move well to the cathode from the anode through the electrolyte membrane when the fuel cell stack is in a humid state. In addition, at the cathode, the hydrogen ions supplied through the electrolyte membrane and the electrons transmitted through the bipolar plate meet the oxygen in the air supplied to the cathode by an air supplier (e.g., air blower) and cause a reaction that produces water. Thus if the operation of the fuel cell stack continues in the idling state, the produced water may go beyond an appropriate level suitable for the operation of the fuel cell stack. The water balance may be calculated by measuring a Water In value and a Water Out value. In some implementations, the water balance of the fuel cell stack may be calculated using the equation:

$$m\_h2o\_total = m\_v\_air\_in + m\_v\_h2\_in + m\_h2o\_prud - m\_v\_air\_out - m\_v\_h2\_out$$

where: m_h2o_total indicates a water balance which may be wet (+ value), or dry (− value), m_v_air_in is a cathode inlet saturated vapor mass flow rate [g/s], m_v_h2_in is an anode inlet saturated vapor mass flow rate [g/s], m_h2o_prud is a water generation rate [g/s] for the fuel cell stack, m_v_air_out is a cathode outlet saturated vapor mass flow rate [g/s], and m_v_h2_out is an anode outlet saturated vapor mass flow rate [g/s].

When the calculated value at S305 is less than zero, representing a dry state, the process returns to the initial step S301 and the process is repeated. The dry state refers to a dry state of the electrolyte membrane and results in reduction in the output of the fuel cell stack.

However, when the calculated value at S305 is greater than zero, the fuel cell system controller determines that the fuel cell stack is in a wet state. The wet state means a wet state of the electrolyte membrane of the fuel cell stack, and the degree of the wet state can be determined based on the humidity of supplied air and water generated from the reaction in the membrane.

After determining that the fuel cell stack is in a wet state, the fuel cell system controller 70 starts a counter stored in a memory 71 at S306 that increments by 1 second until the counter reaches a predefined time period X. In some implementations X may be defined in terms of hours, but any time period could be used. In other words, the operation of the fuel cell stack may repeatedly turn-on and turn-off (i.e., fuel-cell based on/off mode) based on the SOC of the battery 204 until the time reaches the predetermined time period.

When the fuel cell system controller 70 determines that the counter reaches the predetermined time period X at S307, the fuel cell system controller 70 sends a signal to the controller 200 to turn off the ignition switch. Alternatively, when the fuel cell system controller 70 determines that the counter does not yet reach the predetermined time period X, the counter increments by 1 second until the counter reaches the predetermined time period X.

Upon receipt of the signal from the fuel cell system controller 70, the controller 200 may turn off the ignition switch 202 at S308, and thus the vehicle is turned off and also the repeated fuel-cell on/off mode terminates at the same time. As a result, the fuel cell stack may avoid the flooding state in which the degree of water balance goes beyond a proper level of wetness of the membrane of the fuel cell stack.

On the other hand, when the fuel-cell on/off mode is disabled (i.e., FC On/Off=0) at step S309, the fuel cell stack is active to generate electric energy regardless of the SOC of the battery. The process proceeds to a next step S310.

At step S310, which is performed when the fuel cell on/off mode is disabled, the fuel cell system controller 70 calculate a degree of water balance of the fuel cell stack of the fuel cell system based on the equation below, which is the same equation discussed above:

$$m\_h2o\_total = m\_v\_air\_in + m\_v\_h2\_in + m\_h2o\_prud - m\_v\_air\_out - m\_v\_h2\_out$$

where: m_h2o_total indicates a water balance which may be wet (+ value), or dry (− value), m_v_air_in is a cathode inlet saturated vapor mass flow rate [g/s], m_v_h2_in is an anode inlet saturated vapor mass flow rate [g/s], m_h2o_prud is a water generation rate [g/s] for the fuel cell stack, m_v_air_out is a cathode outlet saturated vapor mass flow rate [g/s], and m_v_h2_out is an anode outlet saturated vapor mass flow rate [g/s].

When the calculated value at S310 is equal to or greater than zero, representing a wet state, the process returns to the initial step S301. However, when the calculated value (i.e., m_h2o_total) at S310 is less than zero, the fuel cell system controller 70 determines that the fuel cell stack is in the dry state in which the electrolyte membrane is dry and the performance of the fuel cell stack drops.

After determining that the fuel cell stack is in a dry state, the fuel cell system controller 70 starts a counter stored in a memory 71 at S311 that increments by 1 second until the counter reaches a predetermined time period Y. In other words, the fuel cell stack may continue to operate (i.e., fuel-cell based on/off mode is disabled), regardless of the SOC of the battery 204, until the counter reaches the predetermined time period (Y). In some implementations, Y may be defined in terms of hours, but any time period could be used.

At S312, when the counter does not reach the predetermined time period Y, the counter continues to increment by 1 second. Alternatively, when the fuel cell system controller 70 determines that the counter reaches the predetermined time period Y at S312, the fuel cell system controller 70 sends to the controller 200 a signal requesting to turn off the ignition switch of the vehicle.

Based on the received signal from the fuel cell system controller 70, the controller 200 may turn off the ignition switch at so that the vehicle is turn off and also the operation of the fuel cell system terminates at the same time.

As discussed above, the fuel cell system 100 of the present disclosure is provided with the functionality of enabling or disabling the fuel-cell on/off mode based on a temperature of the coolant, and a degree of water balance of the fuel cell stack, and may terminate the ignition switch of the vehicle after passing a predetermined time period when the vehicle is running in an idling state. The predetermined time period varies based on the state of water balance of the fuel cell stack. Also, the predetermined time period (e.g., X or Y hour) may be an experimental value which is dependent on the fuel cell stack design, fuel cell stack's characteristics, etc. The predetermined time period (e.g., X or Y) may be based on lab experiments on how long it takes for a water balance value to be less than zero or greater than zero during when the fuel-cell on/off mode is disabled or enabled.

The control method of the ignition of a vehicle discussed above provides advantages of inhibiting the fuel cell stack from being dry or flooding such that the durability of the fuel cell stack is improved. In addition, by turning off the ignition switch of the vehicle after passing the predetermined time period, the loss of fuel cell by continuous idling of the vehicle is inhibited.

Figure 4:
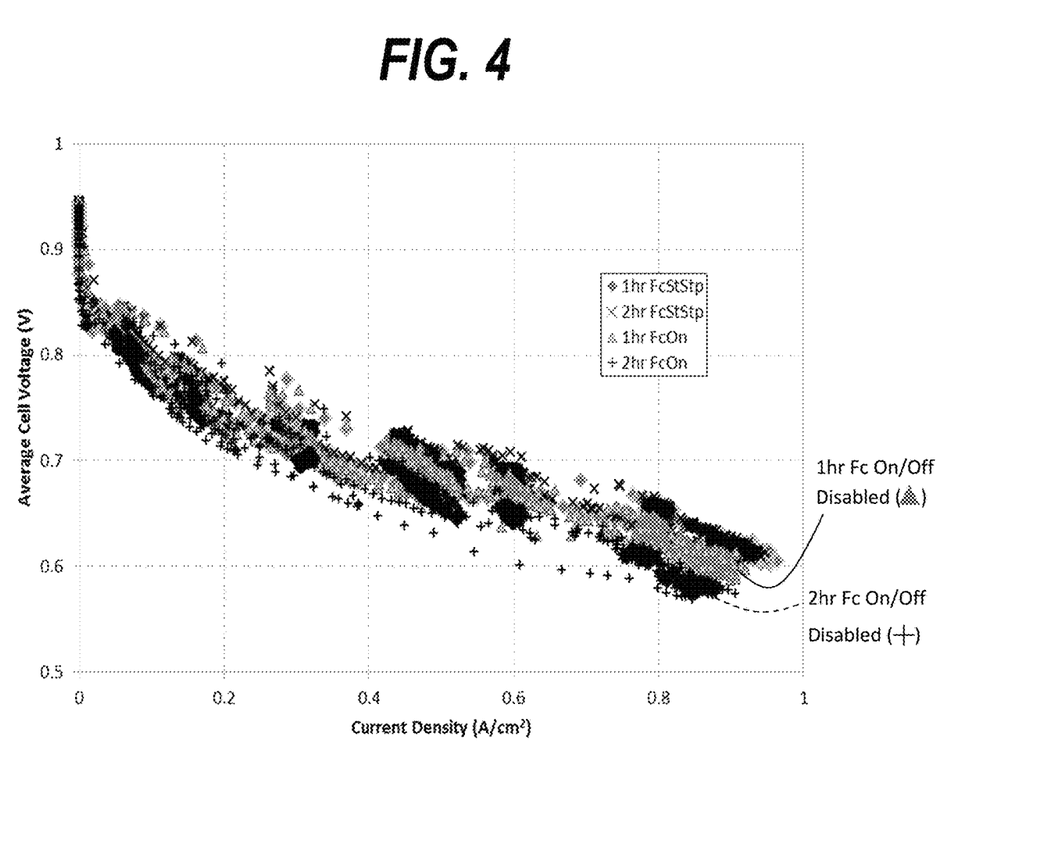
FIG. 4 illustrates a voltage drop and associated power drop in a currently used fuel cell system.
Figure 5:
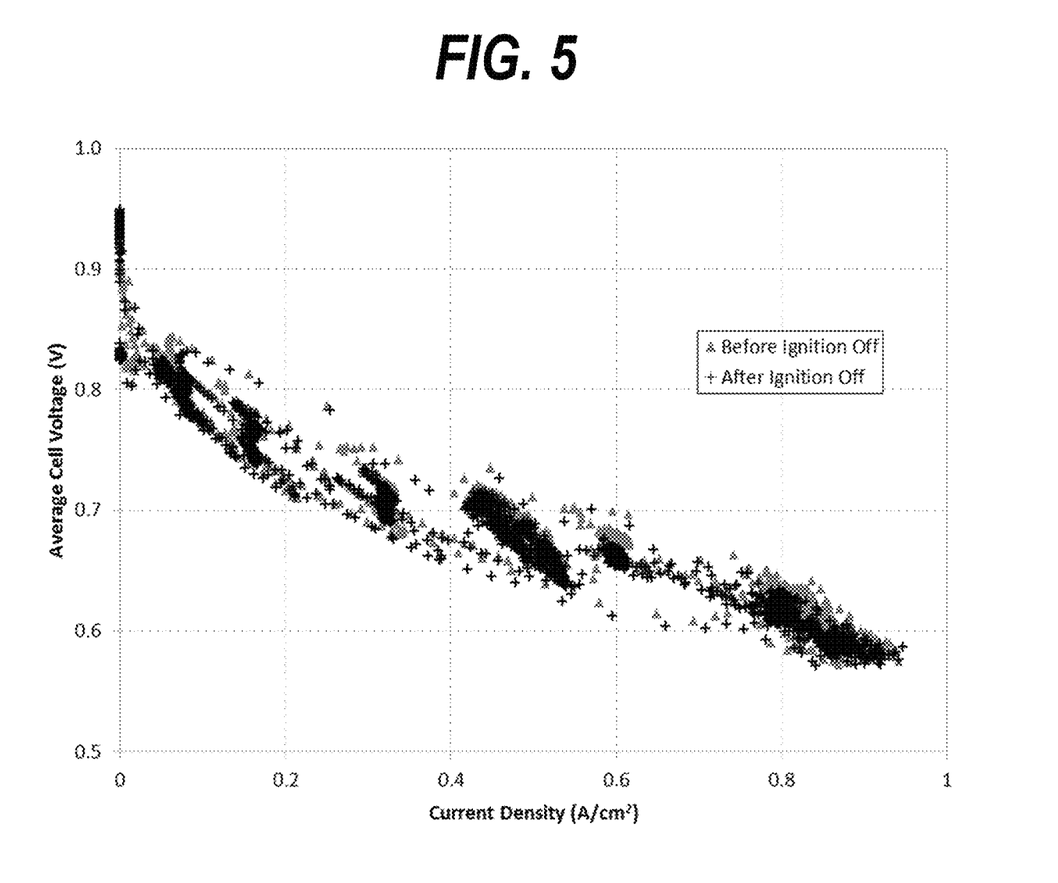
FIG. 5 illustrates a voltage and associated power drop for a fuel cell system utilizing a control to turn off an ignition switch after a predetermined time period.

FIG. 4 illustrates a voltage drop and associated power drop in a conventional fuel cell system and FIG. 5 illustrates a voltage drop and associated power drop for a fuel cell system utilizing a control to turn off an ignition switch after a predetermined time period.

Referring to FIG. 4, the "1 hr Fc On/Off Disable" curve and the "2 hr Fc On/Off Disable" curve are both obtained when a fuel cell stack continuously operates in the idle state. The curves show that a voltage of the fuel cell stack operated for two hours drops significantly when compared to the voltage generated over one hour operation in the idle state. This test indicates that, with a long idle state, the voltage decreases over time as the fuel cell stack becomes dried out due to a continuous air blow operation. Based on relationship between power, voltage and current (i.e., Power=Voltage*Current), the decreased voltage causes a decrease in the power. In order to maintain a similar lever of power output, the fuel cell system would need to pull more current than before to generate desired fuel cell power to compensate for voltage loss. Pulling more current means that more hydrogen is consumed and more heat is generated. This negatively impacts on durability, fuel economy and cooling performance of fuel cell stack.

However, as illustrated in FIG. 5, when the fuel cell system utilizes a control to turn off an ignition switch after a predetermined time period, the voltage of "After Ignition Off" maintains the same level as the voltage of "Before Ignition On" (i.e. voltage values in both curves are substantially overlapped). In other words, the voltage vs current curve maintains similar performance (i.e., maintaining similar power generation so that the loss in fuel economy, power, and heat generation is substantially reduced) over the time (e.g., 1 hour or 2 hours) and indicates that the durability of the fuel cell stack is improved.

As described above with the exemplary forms, the fuel cell system of the present disclosure is provided with the functionality of enabling or disabling the fuel-cell on/off mode based on a temperature of the coolant, and a degree of water balance of the fuel cell stack, and may terminate the ignition switch of the vehicle after passing a predetermined time period when the vehicle is running in an idling state (i.e., an auto ignition off control).

The auto ignition off control for a vehicle discussed above provides advantages of inhibiting the fuel cell stack from being dry or flooding. As a result, the durability of the fuel cell stack is improved, and the loss of fuel cell by continuous idling of the vehicle is inhibited.

Although the present disclosure has been shown and described with respect to specific exemplary forms, it will be obvious to those skilled in the art that the present disclosure may be variously modified and altered without departing from the spirit and scope of the present disclosure.

What is claimed is:

1. A method of controlling ignition of a vehicle having a fuel cell system, comprising:
   determining, by a controller, that a vehicle is in an idle state based on whether an ignition switch of a vehicle is on and whether the vehicle is parked;
   after determining that the vehicle is in the idle state, enabling or disabling a fuel-cell on/off mode by a fuel cell system controller, based on a coolant temperature of the fuel cell system;
   after enabling or disabling the fuel-cell on/off mode, determining, by the fuel cell system controller, a degree of water balance of a fuel cell stack of the fuel cell system, wherein the degree of water balance of the fuel cell stack is calculated based on at least one of a water generation rate in the fuel cell stack, or a saturated vapor mass flow rate at a cathode and an anode of the fuel cell stack;

turning off, by the controller, the ignition switch of the vehicle, when the degree of water balance is in a wet state, after a first predetermined time period passes when the fuel cell stack is in the fuel-cell on/off mode, and turning off, by the controller, the ignition switch of the vehicle, when the degree of water balance is in a dry state, after a second predetermined time period passes when the fuel-cell on/off mode is disabled.

2. The method of claim 1, further comprising:

disabling, with the fuel cell system controller, the fuel-cell on/off mode when the coolant temperature is lower than a predetermined temperature; and enabling, with the fuel cell system controller, the fuel-cell on/off mode when the coolant temperature is greater than the predetermined temperature.

3. The method of claim 2, further comprising:

when the fuel-cell on/off mode is disabled, determining, with the fuel cell system controller, whether the degree of water balance is in a dry state; and when the fuel-cell on/off mode is enabled, determining, with the fuel cell system controller, whether the degree of water balance is in a wet state.

4. The method of claim 3, further comprising:

when the degree of water balance is determined to be in the dry state, initiating, with the fuel cell system controller, a counter and turning off the ignition switch of the vehicle when the counter reaches the second predetermined time period.

5. The method of claim 3, further comprising:

when the degree of water balance is determined to be in the wet state, initiating, with the fuel cell system controller, a counter and turning off the ignition switch of the vehicle when the counter reaches the first predetermined time period.

6. The method of claim 1, further comprising:

when the fuel cell system controller determines to disable the fuel-cell on/off mode, turning on the fuel cell system and continuing to operate the fuel cell system regardless of a status of charging (SOC) level of a battery of the fuel cell system.

7. The method of claim 1, further comprising:

when the fuel cell system controller determines to enable the fuel-cell on/off mode, turning on the fuel cell system when a status of charging (SOC) level of a battery of the fuel cell system is less than a predetermined level, and turning off the fuel cell system when the SOC level is equal or greater than the predetermined level.

8. The method of claim 7, further comprising:

when the fuel-cell on/off mode is enabled and the fuel cell system is on, charging the battery, and when the fuel cell system is in an off mode of the fuel-cell on/off mode, cutting off air supply by an air blower while a cooling pump and a fuel cell hydrogen circulation pump are active.

9. The method of claim 1, further comprising:

calculating, with the fuel cell system controller, the degree of water balance based on an equation:

$$m\_h2o\_\text{total} = m\_v\_\text{air\_in} + m\_v\_h2\_\text{in} + m\_h2o\_\text{prud} - m\_v\_\text{air\_out} - m\_v\_h2\_\text{out}$$

where, m_h2o_total is a stack water balance, m_v_air_in is a cathode inlet saturated vapor mass flow rate [g/s], m_v_h2_in is an anode inlet saturated vapor mass flow rate [g/s], m_h2o_prud is water generation rate [g/s], m_v_air_out is a cathode outlet saturated vapor mass flow rate [g/s], and m_v_h2_out is an anode outlet saturated vapor mass flow rate [g/s].

* * * * *